(12) United States Patent
Petty

(10) Patent No.: US 7,401,836 B2
(45) Date of Patent: Jul. 22, 2008

(54) SUN SCREEN AND DISPLAY SYSTEM FOR PICKUP TRUCKS AND THE LIKE

(76) Inventor: Malcolm Petty, P.O. Box 57, Cresson, TX (US) 76035

( * ) Notice: Subject to any disclaimer, the term of this patent is extended or adjusted under 35 U.S.C. 154(b) by 64 days.

(21) Appl. No.: 11/181,434

(22) Filed: Jul. 14, 2005

(65) Prior Publication Data

US 2006/0012201 A1    Jan. 19, 2006

Related U.S. Application Data

(60) Provisional application No. 60/588,267, filed on Jul. 15, 2004.

(51) Int. Cl.
*B60J 1/20* (2006.01)

(52) U.S. Cl. .................... 296/95.1; 296/97.2; 296/97.4; 150/168; 160/370.21

(58) Field of Classification Search ............ 40/502, 40/503, 506; 49/61, 62, 63, 67; 52/473; 150/168; 160/107, 370.21; 296/21, 95.1, 296/97.2, 97.4, 97.7, 152
See application file for complete search history.

(56) References Cited

U.S. PATENT DOCUMENTS

| | | | | |
|---|---|---|---|---|
| 3,135,063 A * | 6/1964 | Ricks | ........................ | 40/502 |
| 3,383,785 A * | 5/1968 | Werner | ........................ | 40/502 |
| 5,203,394 A * | 4/1993 | Hailey | ..................... | 160/166.1 |

* cited by examiner

*Primary Examiner*—Lori I. Lyjak
(74) *Attorney, Agent, or Firm*—Michael A. O'Neil

(57) ABSTRACT

An accessory for a pickup truck ad the like comprising a frame positioned behind the rear window thereof. The frame supports a plurality of louvers which are selectively positionable in first, second, and third orientations. The louvers are substantially transparent and at least one exterior surface thereof is reflective. The louvers are adapted to display selected graphics when positioned in the first and third orientations. The accessory may also employ triangular louvers which may be adapted to display selected graphics which positioned in the first, second, and third orientations.

11 Claims, 7 Drawing Sheets

SUN SCREEN AND DISPLAY SYSTEM FOR PICKUP TRUCKS AND THE LIKE

CLAIM OF PRIORITY

This application claims priority of prior provisional Application Ser. No. 60/588,267 filed Jul. 15, 2004, the entire content of which is incorporated herein by reference.

TECHNICAL FIELD

This invention relates generally to vehicular accessories and more particularly to an accessory for the rear windows of pickup trucks and the like which simultaneously provides sun screening and display of graphics such as advertising, artwork, etc.

BACKGROUND AND SUMMARY OF THE INVENTION

As is well known, all modern vehicles are provided with visors which can be deployed either at the windshield or at the side windows of the vehicle to limit glare from the sun thereby facilitating safe driving and comfort. Although the use of visors for the windshields and side windows of automobiles, pickup trucks, and other vehicles has been standard practice for decades, devices for preventing glare from the sun from entering vehicles through the rear windows thereof are uncommon. It has been known, however, to provide pickup trucks with an accessory comprising vertically spaced louvers which slope downwardly thereby preventing glare and heat from sun the sun from entering the vehicle while affording at least limited visibility through the rear window thereof.

The present invention comprises an accessory for pickup trucks and similar vehicles which simultaneously prevents glare and heat from the sun from entering the vehicle through the rear window thereof and facilitates the display of graphics such as advertising, artwork, etc. In accordance with the broader aspects of the invention a plurality of louvers are formed from a mirrored semi-transparent material, for example, plastic sheet material. The louvers are pivotally supported on a frame and are arranged in an equally spaced, overlapping array. The louvers are manually or mechanically positionable relative to the rear window of the vehicle upon which the accessory is installed.

In accordance with more specific aspects of the invention the louvers are selectively positionable in any of three orientations. In the first orientation the louvers extend angularly downwardly and substantially parallel to the rear window of the vehicle thereby facilitating the display of a first graphic. In the second orientation the louvers extend perpendicularly to the rear window thereby facilitating maximum visibility therethrough. In the third orientation the louvers extend angularly upwardly and substantially parallel to the rear window thereby facilitating the display of a second graphic.

An alternative embodiment of the present invention employs triangular louvers having three surfaces on which graphics can be displayed thereby facilitating additional display of advertising, graphics, and the like. The triangular louvers are more rigid than substantially flat louvers and thereby eliminate any catching of the louvers or chatter caused by overlap of the louvers.

BRIEF DESCRIPTION OF THE DRAWINGS

A more complete understanding of the present invention may be had by reference to the following Detailed Description when taken in connection with the accompanying Drawings, wherein.

DETAILED DESCRIPTION

Figure 1:
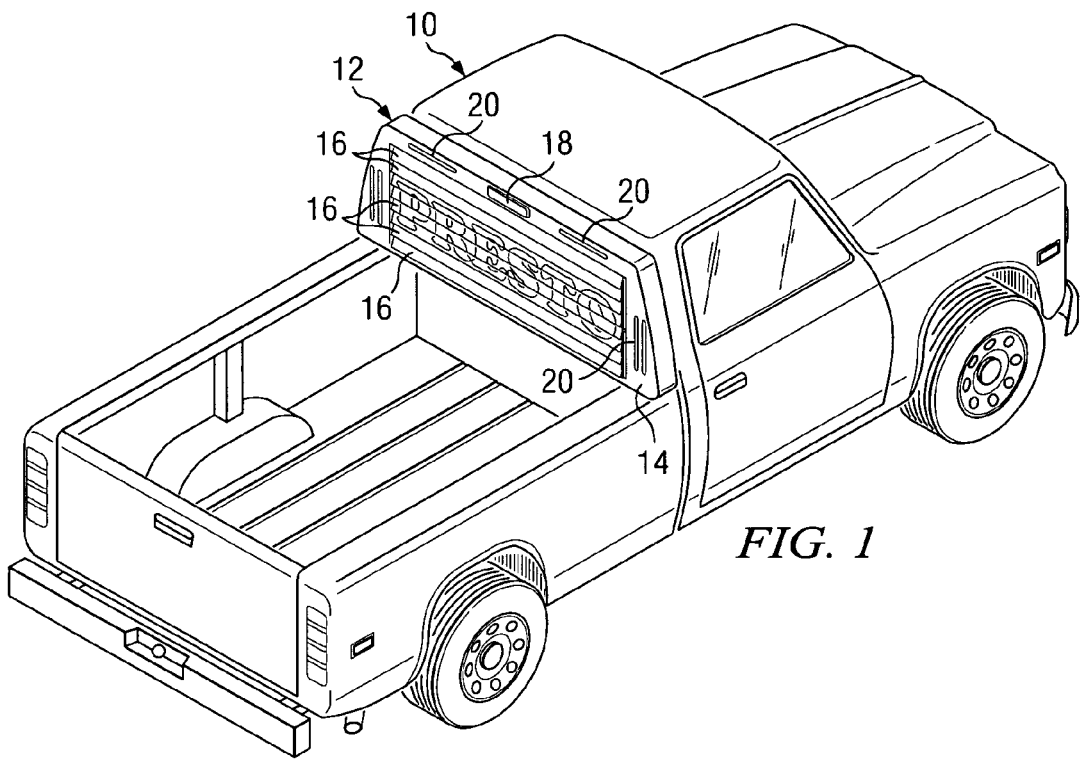
FIG. 1 is a perspective view of a pickup truck having the accessory of the present invention installed thereon.

Referring now to the drawings and particularly to FIG. 1 thereof, there is shown a pickup truck 10 having an accessory 12 comprising the present invention installed thereon. Although a particular type of pickup truck is illustrated in the drawings, it will be understood that the invention is equally applicable to a wide variety of types and kinds of pickup trucks and similar vehicles.

The accessory 12 comprises a frame 14 which may be manufactured from a wide variety of materials including steel, aluminum, and other metals; polyethylene, polystyrene, polyvinylchloride, and other plastics; and other materials including wood. The frame 14 is secured to the cab and/or to the walls of the bed of the pickup truck 10 and is generally vertically oriented. A plurality of louvers 16 are mounted on the frame 14 for pivotal movement with respect thereto. As will become more apparent hereinafter, the louvers 16 are selectively positionable in any of the three orientations relative to the frame 14 of the accessory 12. The frame 14 may also be provided with a lamp 18 for illuminating the bed of the pickup truck 10, running lights 20, and other features.

The louvers 16 of the accessory 12 of the present invention preferably have a mirrored, i.e., provided with reflective exterior surface on at least one side thereof. In this manner the prevention of glare and heat from the sun from entering the interior of the cab of the pickup truck is maximized. Notwithstanding the reflective exterior surface thereof the louvers 16 are constructed to be as transparent as possible thereby facilitating the ability of the driver of the pickup truck to see through the rear window thereof. The louver 16 may be manufactured from the plastic material sold by General Electric under the trademark "LEXAN"®. Other plastic materials may be utilized in the manufacture of the louvers 16 depending upon the requirements of particular applications of the invention.

Figure 2A:
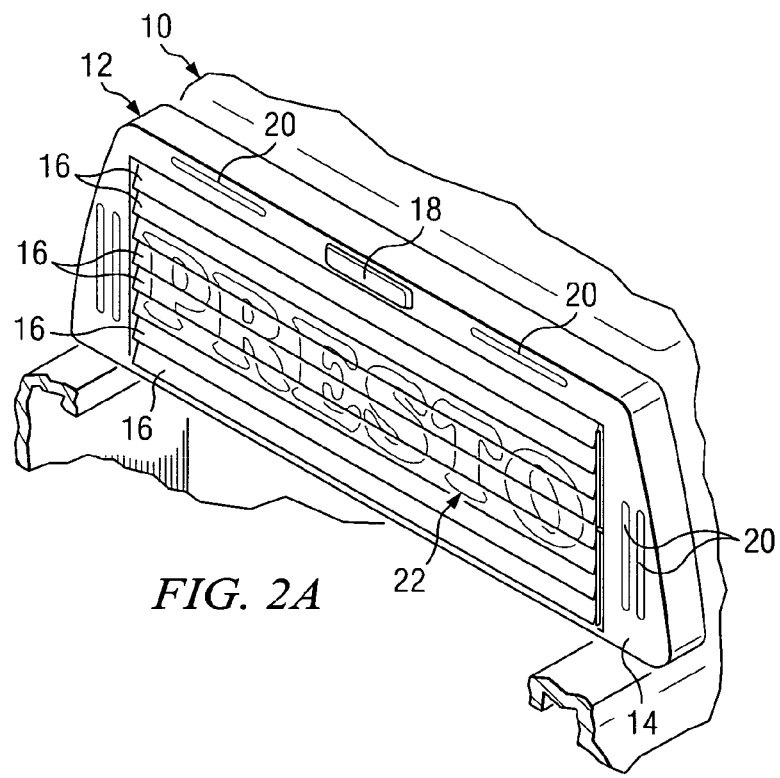
FIG. 2A is an enlargement of a portion of FIG. 1 showing the louvers of the accessory in a first orientation.

FIG. 2A illustrates the louvers 16 of the accessory 12 in a first orientation. In the first orientation the louvers 16 extend angularly downwardly and substantially parallel to the rear window of the pickup truck 10. Positioning of the louvers 16 in the first orientation facilitates the display of a first graphic 22 thereon. The first graphic 22 may comprise an advertisement, artwork, a selected message, etc. The graphic 22 is preferably fabricated in such a way that it does not significantly reduce visibility through the rear window of the pickup truck 10.

Figure 2B:
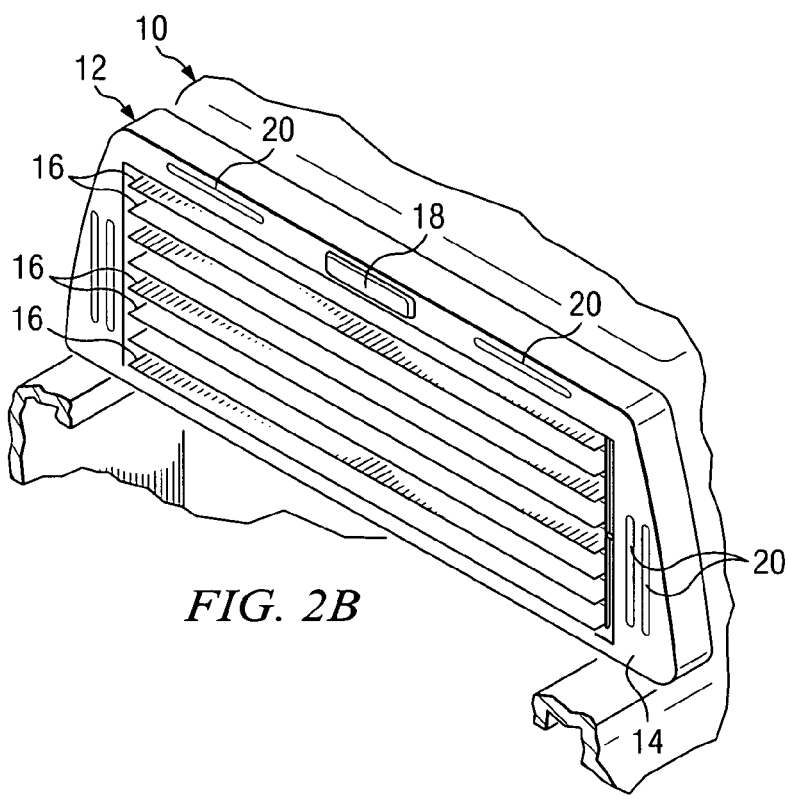
FIG. 2B is a view similar to FIG. 2A showing the louvers of the accessory in a second orientation.

FIG. 2B illustrates the louvers 16 of the accessory 12 in a second orientation. In the second orientation the louvers 16 extend perpendicularly to the rear window of the pickup truck 10. When the louvers 16 are in the second orientation as illustrated in FIG. 2B maximum visibility through the rear window of the pickup truck 10 is afforded.

Figure 2C:
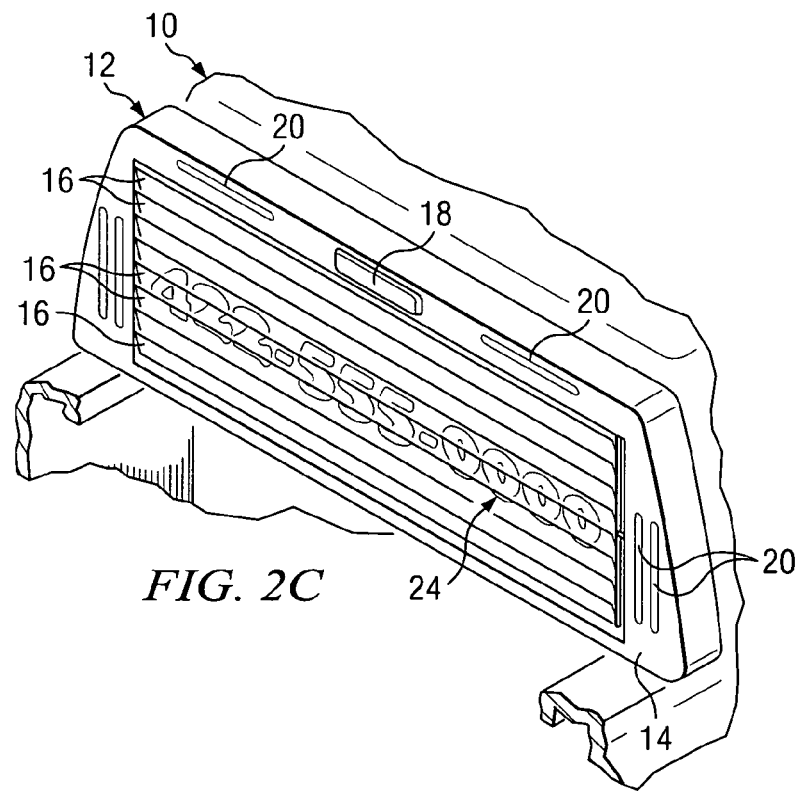
FIG. 2C is a view similar to FIG. 2A showing the louvers of the accessory in a third orientation.

FIG. 2C illustrates the louvers 16 of the accessory 12 in a third orientation. In the third orientation the louvers 16 extend angularly upwardly and substantially parallel to the rear window of the pickup truck 10. Positioning of the louvers 16 in the third orientation facilitates the display of a second graphic 24 thereon. Like the graphic 22 the graphic 24 is preferably fabricated in such as a way as to not significantly reduce visibility through the rear window of the pickup truck 10.

Figure 3:
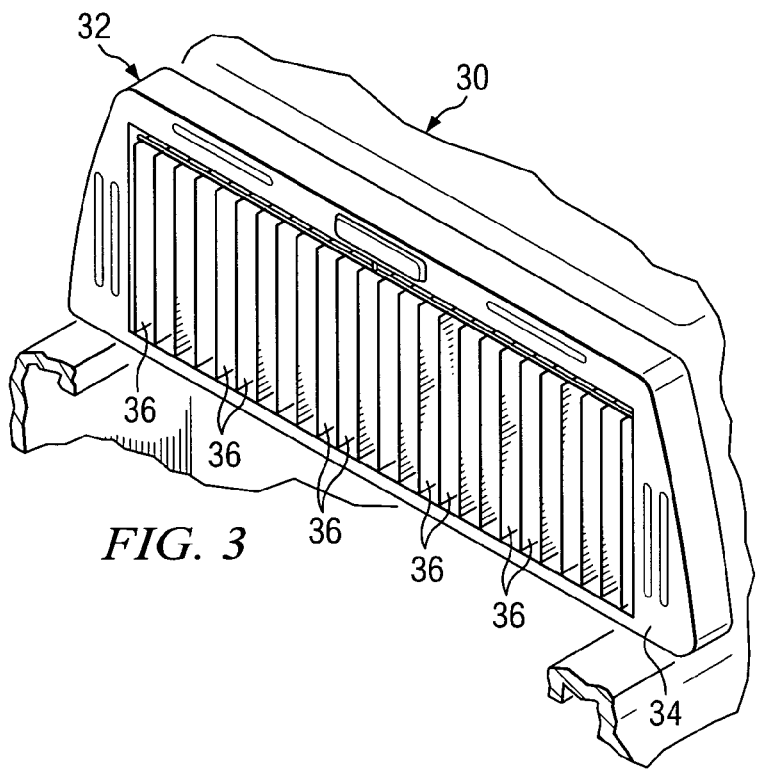
FIG. 3 is a view similar to FIG. 2A illustrating a second embodiment of the invention.

FIG. 3 illustrates a pickup truck 30 equipped with an accessory 32 comprising a second embodiment of the invention. The accessory 32 includes a frame 34 having a plurality of louvers 36 pivotally supported thereon. As opposed to the louvers 16 of the accessory 12 which are horizontally disposed, the louvers 36 of the accessory 32 are vertically disposed. Otherwise the accessory 10 is structurally and functionally identical to the accessory 12 as described hereinabove in conjunction with FIGS. 1, 2A, 2B, and 2C.

Figure 4:
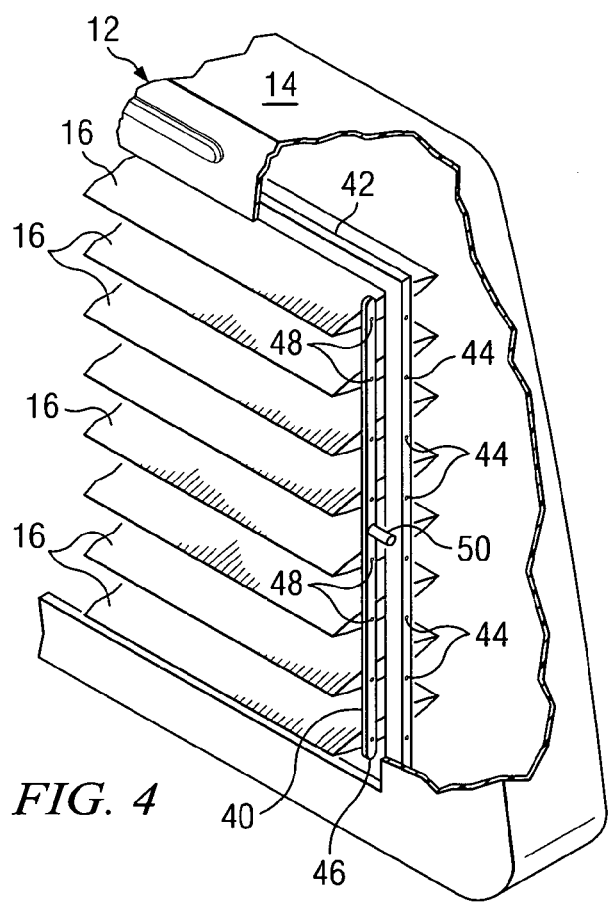
FIG. 4 is an enlargement of a portion of FIG. 2A illustrating a first mechanism for manipulating the louvers of the accessory of the present invention.

FIG. 4 illustrates a first mechanism 40 manipulating the louvers 16 of the accessory 12 between the first, second, and third orientations as illustrated in FIGS. 2A, 2B, and 2C. The louvers 16 are pivotally supported on a subframe 42 by a plurality of pins or rods 44. An actuating rod 46 is pivotally connected to the louvers 16 by a plurality of pins or rods 48. A handle 50 is positioned for convenient actuation by a person situated at one side of the pickup truck 10 and behind the rear window thereof. Actuation of the handle 50 moves the rod 46 vertically thereby manipulating the louver 16 between the first, second, and third orientations as illustrated in FIGS. 2A, 2B, and 2C. The frame 14 may be provided with an access port or a notch to facilitate actuation of the handle 50.

Figure 5:
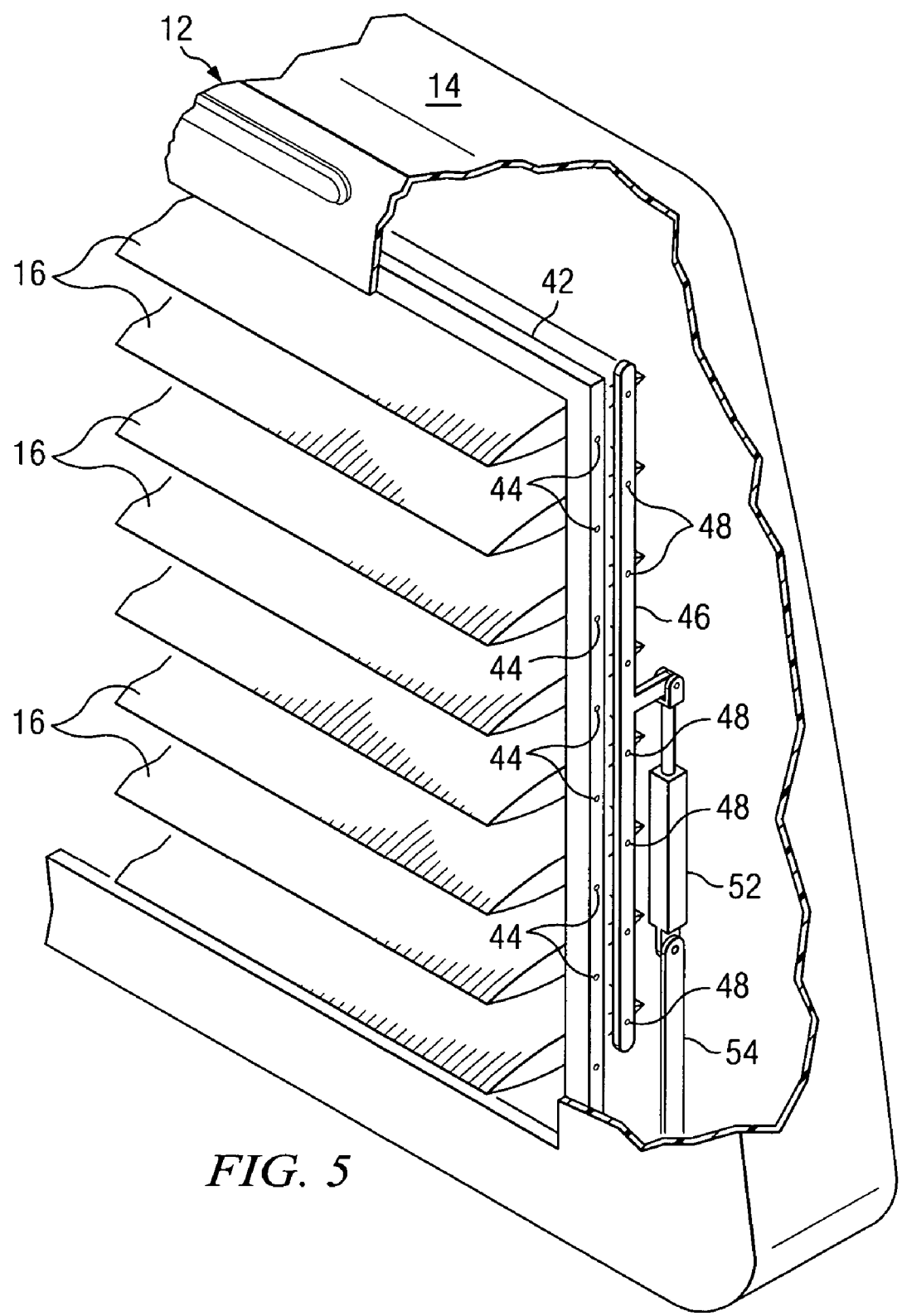
FIG. 5 is an illustration similar to FIG. 4 showing a second mechanism for manipulating the louvers of the accessory of the present invention.

FIG. 5 illustrates an automated mechanism 52 for manipulating the louvers 16 of the accessory 12 between the first, second, and third orientations as illustrated in FIGS. 2A, 2B, and 2C. Many of the component parts of the mechanism 52 are identical to construction and function to component parts of the mechanism 40 as illustrated in FIG. 4 and described hereinabove in conjunction therewith. Such identical component parts are designated in FIG. 5 with the same reference numerals utilized in the foregoing description of the mechanism 40.

As opposed to the handle 50 of the mechanism 40 of FIG. 4, the mechanism 52 of FIG. 5 includes an actuator which is connected between the rod 46 and the frame 14 by a bracket 54. The mechanism 52 may comprise a three position electrical solenoid, a three position fluid powered cylinder, or any other type of three position actuator. The mechanism 52 is adapted for actuation by the driver of the pickup truck 10 from within the cab thereof thereby facilitating the manipulation of the louvers 16 between the first, second, and third orientations thereof without leaving the cab of the pickup truck 10.

Figure 6A:
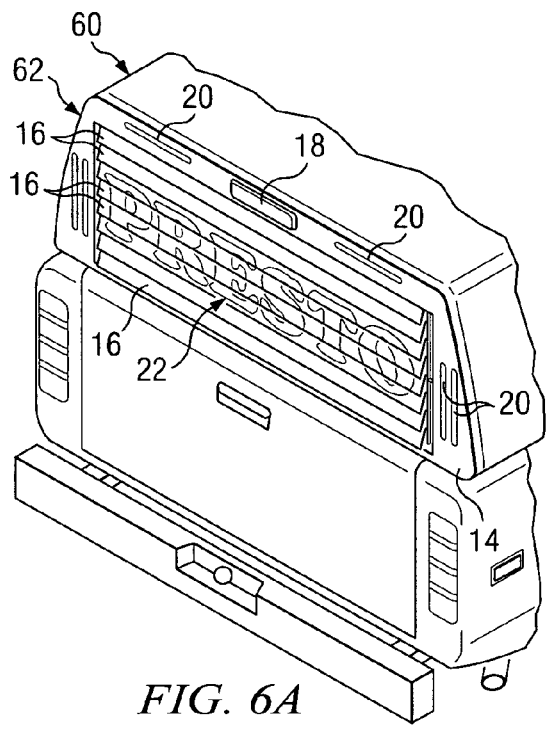
FIG. 6A is an illustration similar to FIG. 2A showing the accessory of the present invention installed on a pickup bed cover and illustrating the louvers of the accessory in a first orientation.
Figure 6B:
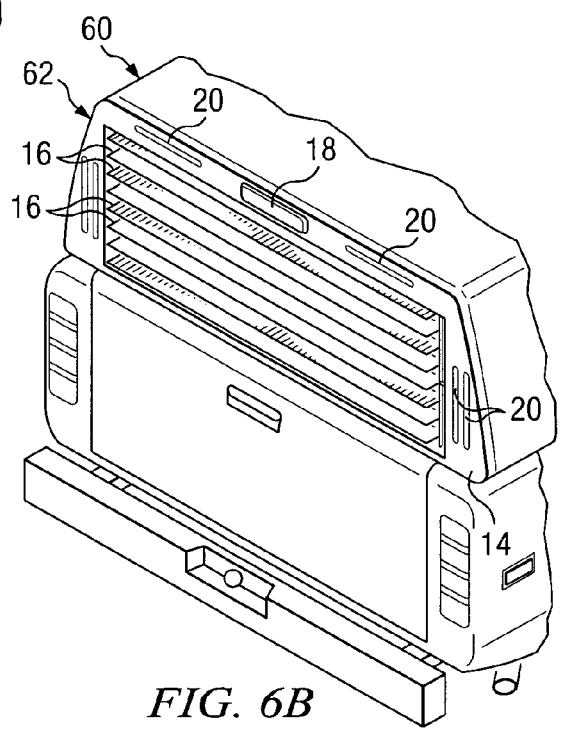
FIG. 6B is a view similar to FIG. 6A illustrating the louvers of the accessory in a second orientation.
Figure 6C:
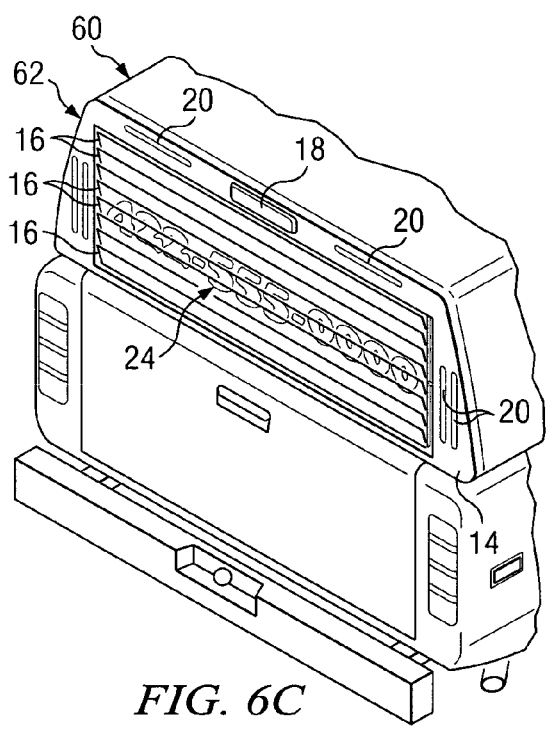
FIG. 6C is a view similar to FIG. 6A showing the louvers of the accessory in a third orientation.

FIGS. 6A, 6B and 6C illustrate a pickup bed cover 60 having an accessory 62 comprising the present invention installed therein. Many of the component parts of the accessory 62 are substantially identical in construction and function to component parts of the accessory 12 as illustrated in FIGS. 1, 2A, 2B, and 2C and described hereinabove in conjunction therewith. Such identical component parts are designated in FIGS. 6A, 6B, and 6C with the same reference numerals utilized hereinabove in the description of the accessory 12. Other than the fact that it is installed in the pickup bed cover 60, the accessory 62 is structurally and functionally identical to the accessory 12.

Figure 7:
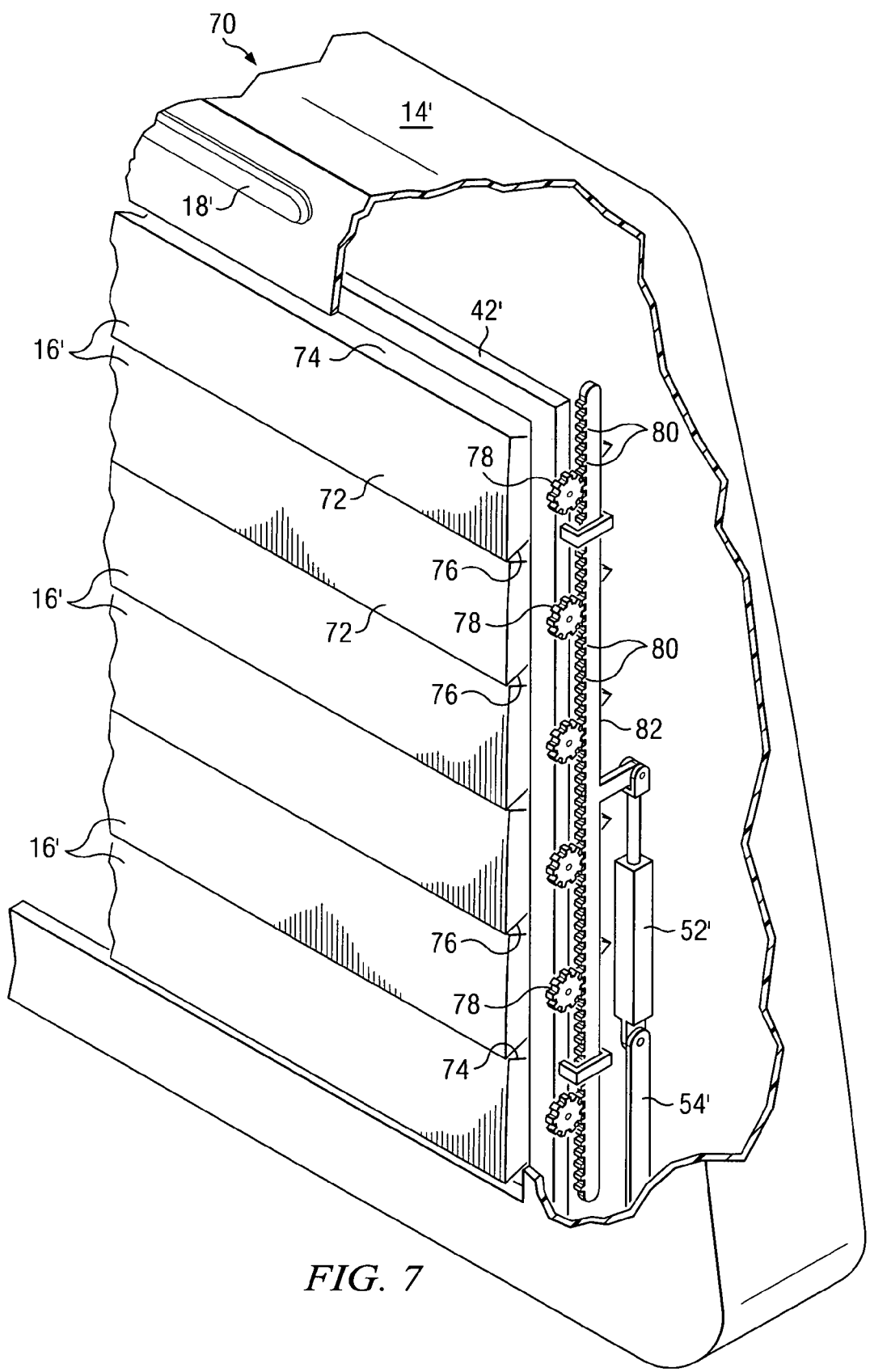
FIG. 7 is a view similar to FIG. 4 showing the accessory of the present invention employing triangular louvers.

FIG. 7 illustrates the pickup truck 10 having an accessory 70 comprising the present invention installed thereon. Many of the component parts of the accessory 70 are substantially identical in construction and function to component parts of the accessory 12 as illustrated in FIGS. 1 through 6 and described hereinabove in conjunction therewith. Such identical component parts are designated in FIG. 7 with the same reference numerals utilized above in the description of the accessory 12, but are differentiated therefrom by means of a prime (') designation.

The accessory 70 differs from the accessory 12 of FIGS. 1 through 6 in that the accessory 70 employs louvers 16' having a triangular shape. The triangular louvers 16' are selectively positionable in at least three orientations relative to the frame 14'. A first orientation of the louvers 16' places a first surface 72 of the louvers 16' in an orientation substantially parallel to rear window of the truck 10 thereby facilitating the display of a first graphic. Similarly, a second orientation of the louvers 16' places a second surface 74 of each louver 16' in an orientation substantially parallel to the rear window of the truck 10 thereby facilitating the display of a second graphic. Similarly, a third orientation of the louvers 16' places a third surface 76 of each louver in an orientation substantially parallel to rear window of the truck 10 thereby facilitating the display of a third graphic.

The louvers 16' are pivotally supported on a subframe 42' by a plurality of gear wheels 78. The gear wheels 78 are secured in moveable mating engagement with teeth 80 along the edge of an actuating rod 82. An automated mechanism 52' having an actuator connected between the rod 82 and the frame 14' by a bracket 54' provides means for a driver of the truck 10 to actuate and manipulate the louvers 16' between the first, second, and third orientations.

Figure 8:
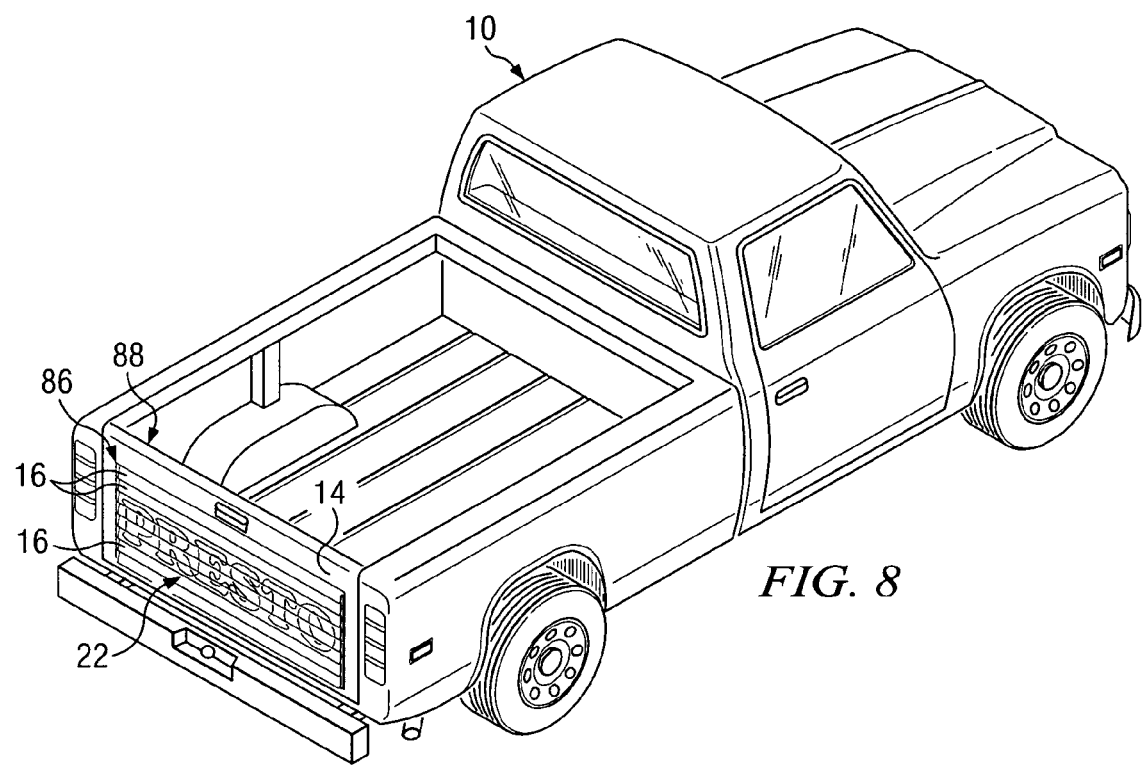
FIG. 8 is a view similar to FIG. 1 showing the accessory of the present invention installed on a tailgate of a pickup truck.

FIG. 8 illustrates the pickup truck 10 having an accessory 86 comprising yet another embodiment of the present invention installed on a tailgate 88 thereof. Many of the component parts of the accessory 86 are substantially identical in construction and function to component parts of the accessory 12 as illustrated in FIGS. 1 through 6 and described hereinabove in conjunction therewith. Such identical component parts are designated in FIG. 8 with the same reference numerals utilized hereinabove in the description of the accessory 12. Other than the fact that it is installed on the tailgate 88 of the pickup 10, the accessory 86 is structurally and functionally identical to the accessory 12.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

The invention claimed is:

1. An accessory for a vehicle comprising:
a plurality of louvers;
a frame for supporting the louvers adjacent a window of the vehicle;
means for supporting the louvers for pivotal movement relative to the frame;
means for selectively pivoting the louvers relative to the frame between a first orientation wherein the louvers extend substantially parallel to the window of the vehicle and angularly downwardly, a second position wherein the louvers extend perpendicularly to the window of the vehicle, and a third orientation wherein the louvers extend substantially parallel to the window of the vehicle and angularly upwardly.

2. The accessory according to claim 1 wherein the louvers are substantially transparent.

3. The accessory according to claim 1 wherein each of the louvers has at least one exterior surface which is reflective.

4. The accessory according to claim 3 wherein the louvers display a predetermined graphic when positioned in the first orientation.

5. The accessory according to claim 3 wherein the louvers display a predetermined graphic when positioned in the third orientation.

6. An accessory for a vehicle comprising:
a plurality of triangular louvers each having first, second, and third outer surfaces;
a frame for supporting the louvers adjacent a window of the vehicle;
means for supporting the louvers for pivotal movement relative to the frame;
means for selectively pivoting the louvers relative to the frame between a first orientation wherein the first outer surface of the louvers is positioned substantially parallel with the window of the vehicle, a second orientation wherein the second outer surface of the louver is positioned substantially parallel with the window of the vehicle, and a third orientation wherein the third outer surface of the louvers is positioned substantially parallel with the window of the vehicle.

7. The accessory according to claim 6 wherein the louvers are substantially transparent.

8. The accessory according to claim 6 wherein each of the louvers has at least one exterior surface which is reflective.

9. The accessory according to claim 8 wherein the louvers display a predetermined graphic when positioned in the first orientation.

10. The accessory according to claim 8 wherein the louvers display a predetermined graphic when positioned in the second orientation.

11. The accessory according to claim 8 wherein the louvers display a predetermined graphic when positioned in the third orientation.

* * * * *